June 28, 1955  F. R. WILSON  2,711,773
TUBE FLARING TOOL
Filed March 1, 1952  5 Sheets-Sheet 1

INVENTOR.
FRANK R. WILSON
BY
DES JARDINS, ROBINSON & KEISER
HIS ATTORNEYS

June 28, 1955     F. R. WILSON     2,711,773
TUBE FLARING TOOL
Filed March 1, 1952     5 Sheets-Sheet 2

INVENTOR.
FRANK R. WILSON
BY
DES JARDINS, ROBINSON & KEISER
HIS ATTORNEYS

June 28, 1955  F. R. WILSON  2,711,773
TUBE FLARING TOOL
Filed March 1, 1952  5 Sheets-Sheet 3

INVENTOR.
FRANK R. WILSON
BY
DES JARDINS, ROBINSON & KEISER
HIS ATTORNEYS

June 28, 1955 F. R. WILSON 2,711,773
TUBE FLARING TOOL
Filed March 1, 1952 5 Sheets-Sheet 4

INVENTOR.
FRANK R. WILSON
BY
DES JARDINS, ROBINSON & KEISER
Howard Keiser
HIS ATTORNEYS

United States Patent Office 2,711,773
Patented June 28, 1955

2,711,773

TUBE FLARING TOOL

Frank R. Wilson, Memphis, Tenn.

Application March 1, 1952, Serial No. 274,403

10 Claims. (Cl. 153—81)

This invention relates to a hand tool and, more particularly, to a hand tool for flaring the end of a tube and is a continuation-in-part of my co-pending application Serial No. 192,317 for Tube Flaring Tool, filed October 26, 1950, and later abandoned.

In the prior art tube flaring devices of the hand tool type, it has been customary to cause a cone-shaped plug to be forced into the end of the tube to be flared so as to spread the tube and form a bell-shaped mouth or flare on the end thereof. In the performance of this operation, the tube is usually held in place by means of a split clamping block which grips the tube and holds it stationary while the plug is being forced into the end of the tube. This method of flaring the ends of tubes is slow and inefficient and results in an inferior product since the flare thus formed is dimensionally inaccurate and the surface of the flared portion of the tube will be left in a rough, unfinished condition.

It is, therefore, an object of the present invention to provide a tube flaring tool of the hand-operated type which is adapted to spin a flange on the end of a tube and, thereafter, burnish the interior face of the flange so as to result in a flare having an accurate, polished surface. To accomplish this result, I have devised a tool having a flaring cone of novel construction and having novel means for enabling the operator of the tool to burnish the interior surface of the flange at the conclusion of the tube flaring operation. I have also devised an improved type of clamping device for holding the tube in position while the flare is being formed thereon and also while it is being burnished after the flare has been produced.

Accordingly, it is a further object of this invention to provide a tube flaring tool adapted to produce the desired amount of flare on tubes of various diameters and to permit burnishing of this flare so as to provide a smooth, finished surface on the interior face thereof.

Another object of the invention is to provide a flaring tool having a cone for flaring the end of a tube, together with means for advancing the cone against the end of the tube to flare the same, and for rotating the cone against the flared end of the tube without advancement in order to burnish the same.

Another object of the invention is to provide a flaring tool in which the flaring cone is directly connected with a manually operable handle for rotating the cone, and selectively connected with a feed screw for advancing the cone into the work.

Another object of the invention is to provide a flaring tool of the character set forth in the preceding object in which an anti-friction bearing is provided for absorbing the end thrust produced on the cone during tube flaring operations and for permitting the cone to be rotated without advancement or retraction to permit burnishing of the flare.

A further object of the invention is to provide a tube flaring tool having a flaring cone for flaring the end of a tube and provided with a manually rotatable handle for advancing the cone against the end of the tube to flare the same, the tool being further provided with clutching means shiftable to a position wherein continued rotation of the handle serves to rotate the cone without advancing it in order to burnish the flared end of the tube.

Another object of the invention is to provide a tube flaring tool having ratchet means for performing the clutching mentioned in the preceding object, the ratchet means being movable to a first position wherein rotation of the handle serves simultaneously to rotate and advance the cone against the work, and movable to a second position wherein continued rotation of the handle rotates the cone without advancing it, said ratchet means being so arranged that reversal of the direction of rotation of the handle after the completion of the burnishing operation serves to withdraw the cone without the necessity of resetting or shifting the ratchet. An alternate procedure is to rotate the handle clockwise so as to advance the flaring means against the end of the tube until the desired flare has been formed thereon after which the handle may be rotated counterclockwise to burnish the flared surface without causing any further advance of the flaring cone. After the burnishing has been completed, the pawl may be moved to its other position and counterclockwise rotation of the handle continued so as to retract the flaring cone from the end of the tube.

Other and further objects of the invention will become apparent from the following description and drawings, in which.

While my invention is susceptible of embodiment in many different forms, I have shown in the drawings and shall hereinafter describe in detail several specific embodiments, with the understanding that the present disclosure is to be considered merely an exemplification of the principles of the invention and is not intended to limit the invention to the particular embodiments illustrated. The scope of the invention will be pointed out in the appended claims.

Referring now to Figs. 1 to 14, inclusive, of the drawings, there is shown herein one form of flaring tool which comprises, in general, a U-shaped fitting or yoke member 21, a tube clamping means 22, and a tube flaring means including a flaring cone 24 adapted to be rotated by a handle 26 and advanced against the upper end of a tube 25 held in place in the clamping means 22.

The tube flaring tool of the present invention is so designed as to provide means for advancing the flaring cone 24 against the end of a tube to produce the required degree of flare on the tube, and then to permit the flaring cone to be rotated against the flared end of the tube without further advancement so as to burnish or otherwise smooth and polish the flare. In the specific embodiments chosen for illustrating the invention, the advancement of the flaring means is accomplished by rotating a threaded member relative to a threaded carrying element mounted upon or forming a part of the yoke member. When the desired degree of flare has been achieved, relative rotation between such members is prevented by means hereinafter to be described whereupon the flaring means may continue to be rotated without simultaneously being advanced. When the burnishing operation has been completed, rotation of the handle 26 serves to withdraw the flaring means from the flared end of the tube and condition the tube flaring tool for the next flaring operation.

Figure 1:
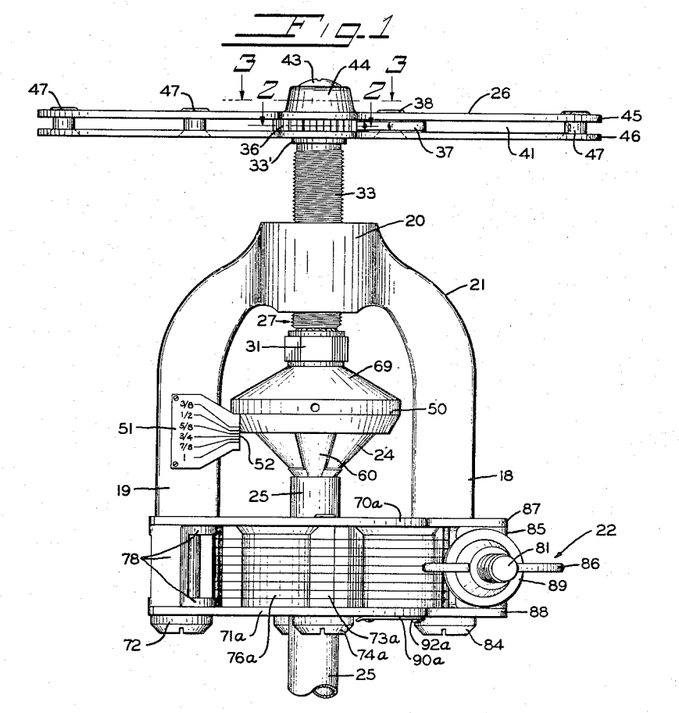
Fig. 1 is a side elevation of one form of flaring tool for carrying out the principles of my invention.
Figure 8:
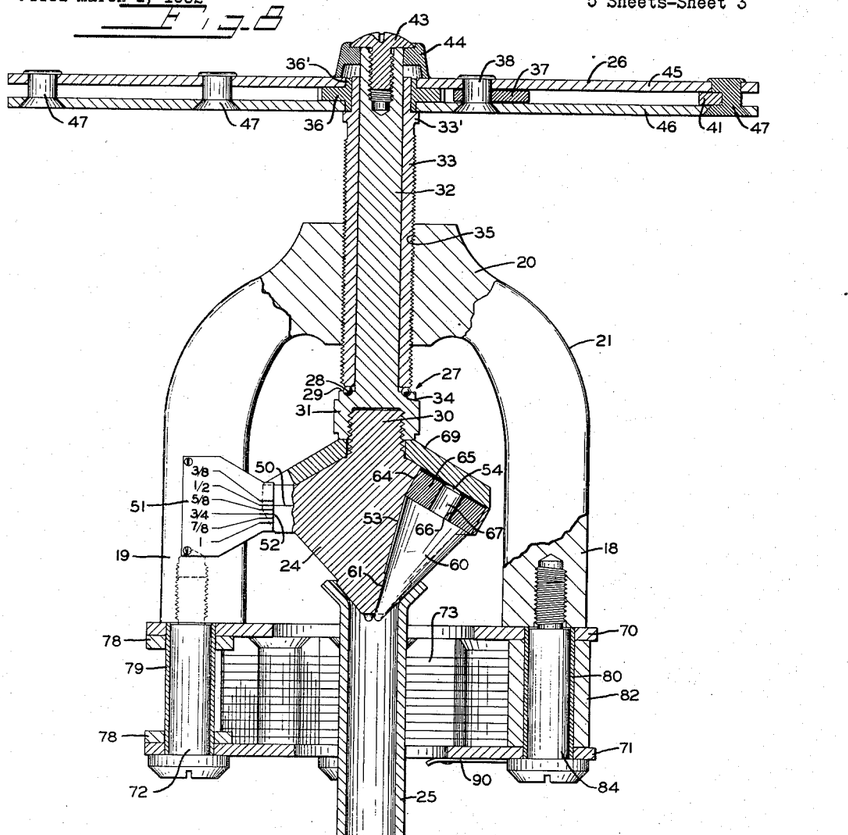
Fig. 8 is an enlarged, cross-sectional view taken along the line 8—8 of Fig. 5.

Referring now to Fig. 8 of the drawings, the base of the cone 24 is provided with a threaded extension or projection 30 on its base which is adapted to be received within a threaded hole provided in an enlarged head 31 formed on the lower end of a spindle or shaft 32 which is rotatably supported within an externally threaded member or sleeve 33. The head 31 is hexagonal in shape, as shown in Fig. 1, so that a wrench may be applied thereto to hold the shaft 32 stationary when the threaded extension 30 on the flaring cone 24 is screwed onto the bottom of the shaft. As shown in Figs. 1 and 8, an anti-friction thrust bearing 27 is provided between the flaring cone and the lower end of the sleeve 33 for the purpose of absorbing the upward thrust produced on the shaft by the cone during tube flaring operations with a minimum of frictional restraint between the shaft and the sleeve. As shown in Fig. 8, this bearing may take the form of a series of small, steel balls 34 running in a raceway 28 provided in a flange or shoulder 29 which defines the top edge of the head 31 formed on the bottom of shaft 32, though it may also take the form of any other suitable device for reducing friction between the shoulder 29 and the bottom of the sleeve 33. The sleeve 33 is supported in a carrying member or element comprising, in the embodiment herein disclosed, an internally threaded opening 35 provided in the cross-arm 20 of the yoke 21.

Figures 2, 3:
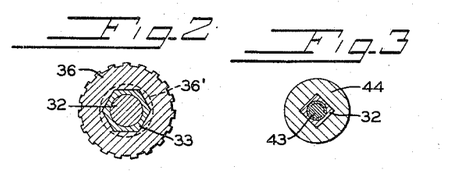
Fig. 2 is a cross-sectional view taken along the line 2—2 of Fig. 1.
Fig. 3 is a cross-sectional view taken along the line 3—3 of Fig. 1.
Figure 4:
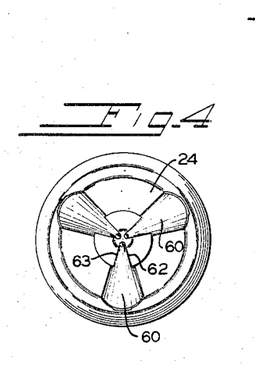
Fig. 4 is an end view of the flaring cone shown in Fig. 1.

At its upper end, the sleeve 33 is provided with an annular flange 33' which lies just beneath the operating handle 26. The sleeve 33 extends a short distance above the flange 33' and this portion of the sleeve is provided with a hexagonal conformation as is clearly illustrated in Fig. 2. A clutch means is provided for connecting the sleeve with the shaft 32, this means including a ratchet 36 mounted on the upper end of the sleeve 33, this ratchet having a hub 36' formed thereon provided with a hexagonal opening which is adapted to mate with the hexagonally-shaped upper extremity of the sleeve 33. Consequently, the ratchet 36 is keyed to the sleeve 33 and is non-rotatable with respect thereto. The notched periphery of the ratchet 36 is adapted to cooperate with either of the teeth 39 or 40 of a double-acting pawl 37 mounted for pivotal movement on a rivet 38 mounted in the handle 26. The pawl 37 is held either in the position shown in Fig. 5, in which the tooth 39 engages with the ratchet 36, or in a shifted position in which the tooth 40 engages with the ratchet, by means of a toggle spring 41 having one end secured to the handle 26 and the other end received within a notch 42 provided in the rear end of the pawl 37. The upper end of the shaft 32 is provided with a portion which is of square cross-section. As illustrated in Figs. 3 and 8 of the drawings, this portion of the shaft is received within a square opening provided in a cap 44 which is welded or otherwise secured to the handle 26. The handle is thus keyed to the shaft 32 so as to constrain these two parts to rotate together. The handle 26 is retained on the upper end of shaft 32 by means of a cap screw 43 which is received within a threaded hole provided in the upper end of the shaft.

The handle 26 is formed of two similar plates 45 and 46 which are held together in spaced relation by means of rivets 47 as shown in Fig. 8. The ratchet 36 lies between the plates 45 and 46 and the hub 36' thereof is received in circular openings provided in the plates. The pawl 37, like the ratchet 36, lies between the plates 45 and 46 and is thereby held in alignment with the ratchet 36.

Figures 5, 6, 7:
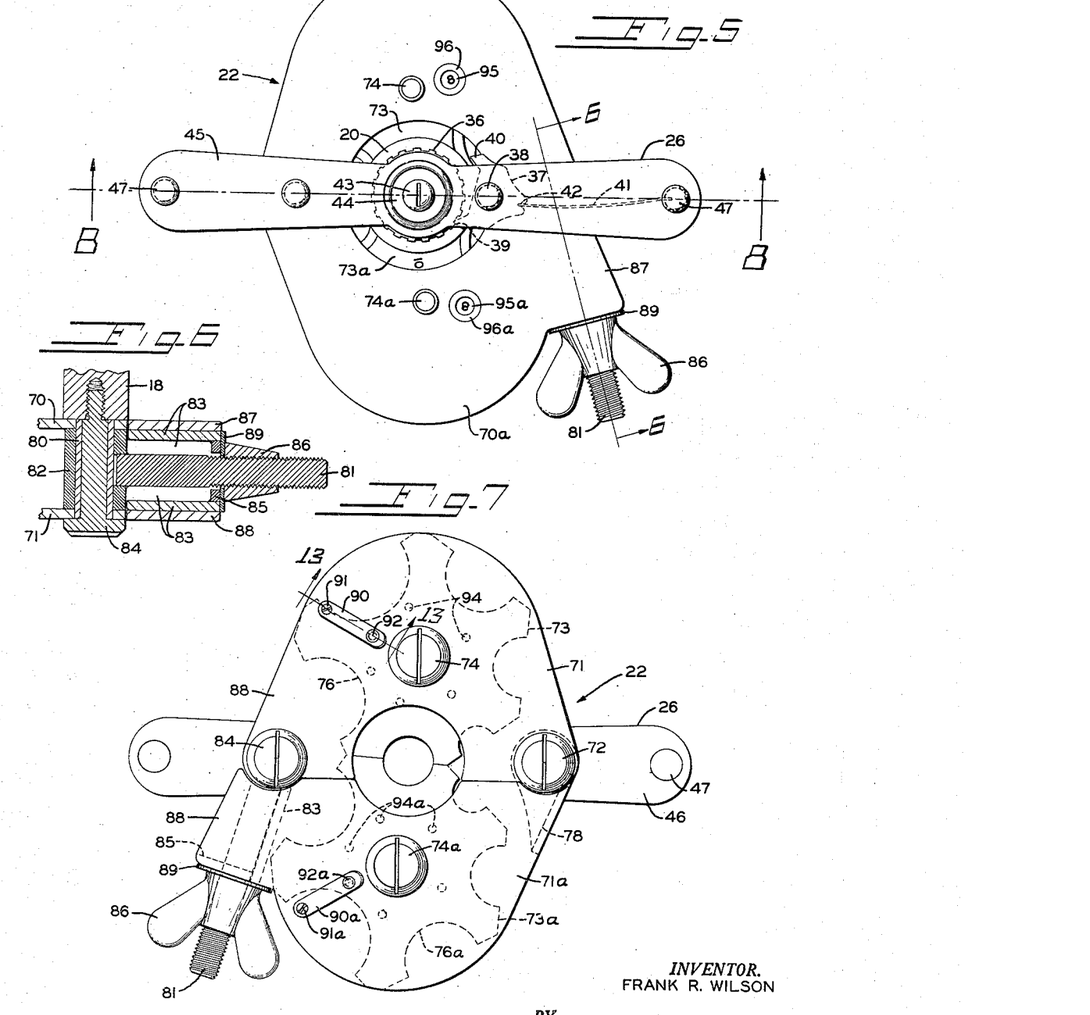
Fig 5 is a top plan view of the device of Fig. 1, showing the clamping means in closed position.
Fig. 6 is a cross-sectional view taken along the line 6—6 of Fig. 5.
Fig. 7 is a bottom view of the device of Fig. 1, after being rotated 180°, showing further details of the tube clamping means.

With the pawl 37 in the position shown in Fig. 5, i. e., with the tooth 39 engaged with the ratchet, clockwise rotation of the handle produces clockwise rotation of the shaft 32 and, through the medium of the ratchet 36 and pawl 37, produces clockwise rotation of the sleeve 33 to advance the flaring cone 24 toward and against the end of the tube 25 to be flared. After the flaring cone has been advanced sufficiently to produce a flare of the desired dimensions on the end of the tube, the direction of rotation of the handle may be reversed to cause burnishing of the flare. Since the frictional restraint of the threads on the sleeve 33 with the threads provided in the opening 35 in the yoke caused by upward pressure on the flaring cone is much greater than the frictional restraint between the bottom of the sleeve 33 and the head 31 on the shaft 32 due to the anti-friction bearing 27, the sleeve will remain stationary while the cone 24 rotates. Hence, the flared end of the tube will be burnished while the tooth 39 of the pawl 37 ratchets over the teeth provided on the ratchet 36. When the burnishing operation is completed, the flaring cone may be retracted by shifting the position of the pawl 37 to bring the tooth 40 into engagement with the ratchet and continuing to rotate the handle counterclockwise whereupon the tooth 40 of the pawl will cause the sleeve 33 to rotate in unison with the shaft 32 and cause upward feeding movement of the cone. After the flaring cone has been returned to its starting position, the pawl may again be flipped to the position shown in Fig. 5 so that clockwise rotation of the handle will again cause downward feeding movement of the flaring cone 24. An alternative procedure is to move the pawl 37 to engage the tooth 40 with the ratchet 36 at the conclusion of the flaring operation and before burnishing. The flare may then be burnished by continuing clockwise rotation of the handle, the nose 40 of the pawl ratcheting over the teeth of the ratchet so as not to feed the cone further into the tube. After thus burnishing the flare, the cone may be retracted by reverse rotation of the handle, that is, by turning it in a counterclockwise direction.

When the first-mentioned procedure is followed, i. e., when the direction of rotation of the handle is reversed at the end of the flaring operation, without changing the position of the pawl, to cause burnishing of the flare, if the tube is removed from the tool before the cone is retracted, the cone may be returned to its original starting position by merely continuing the reverse rotation of the handle since, without the tube pressing against the cone, the drag of the tooth 39 against one of the teeth on the ratchet will exert sufficient turning moment on the sleeve to cause it to rotate counterclockwise and retract the cone.

As shown in Fig. 1, the flaring cone is provided with an index mark 50 which is arranged to cooperate with a scale 51 fixed to one leg of the yoke 21. The scale 51 is provided with rulings 52 for indicating to the user of the tool when to stop the downward feed of the flaring cone in order to produce a flare of standard dimensions on the end of the tube. Thus, in a flaring operation, the handle is rotated until the index mark 50 on the cone is in line with the top of the scale 51 as indicated in Fig. 1, which is the zero or starting point. A tube may then be inserted in the clamping means and brought to a position where its end bears against the bottom of the cone after which it may be clamped in place. The handle is then rotated to advance the cone against the end of the tube until the index mark 50 matches with the ruling 52 corresponding to the diameter of the tube being flared. Thus, if the tube is a ½" tube, the handle is rotated until the index mark 50 is in line with the ½ ruling as indicated in Fig. 8. When this occurs, the necessary amount of flare has been produced and the direction of rotation of the handle may be reversed. The rotation of the handle in a reverse direction serves to rotate the cone, but inasmuch as the sleeve will not be rotated due to ratcheting of the tooth 39 over the teeth of the ratchet 36, no relative rotation occurs between the sleeve and the threads in the yoke member, and hence no advancement of the cone will take place. The rotation of the cone without feed, therefore, serves to burnish the flared end of the tube. After burnishing of the flare has been effected, the pawl may be shifted to move the tooth 40 thereof into engagement with the ratchet and reverse rotation of the handle continued to return the cone to the position shown in Fig. 1.

The flaring cone 24 is so constructed as to provide rolling contact, as contrasted with sliding contact, between the cone and the end of the tube to be flared. To this end, a plurality of conical rollers 60 (Fig. 8) are fitted in the sides of the cone with the apex of each of the rollers located adjacent the apex of the cone. The cone 24 is provided about its periphery with a series of conical recesses within which the rollers 60 are received. Each recess is provided near its apex with a bearing surface 61 for supporting the apex end of its associated roller 60. Above the bearing surface 61, each recess is relieved so as to provide a clearance 53 between the recess and the upper portion of the roller. The bearing surface 61 of each recess extends more than half way around its related roller so as to provide overhanging lips 62 and 63 (Fig. 4) which overlie, in part, the apex end of the roller and hold it in place within the recess. That is, the recesses extend through an arc of more than 180° but substantially less than 360° so as to retain the rollers therein and, at the same time, allow a substantial portion of each roller to project beyond the peripheral face of the cone.

Each of the conical recesses provided in the cone 24 is provided at its base with a cylindrical portion 64 (Fig. 8) within which an annular bushing 65 may be received. Each bushing 65 is provided with a bore 66 within which is journaled a stub shaft or tenon 67 formed on the base end of each roller 60. The rollers and their associated bushings 65 may be inserted in the cone by dropping them through the openings 64 whereupon the lower or apex end of each roller will seat in its respective bearing surface 61 and the upper end thereof will be supported for rotation in the bore 66 of bushing 65. The rollers and bushings are retained in place within the recesses by an annular end cap 69 which is apertured to fit over the threaded extension 30 of the cone 24. This cap is held in place on the end of the cone 24 by the head 31 on shaft 32 which engages the cap when the cone is screwed in place on the lower end of the shaft.

Each tenon 67 of the rollers 60 is provided with a rounded end 54 (Fig. 8) which is adapted, during tube flaring operations, to make contact with the bottom face of the end cap 69 and thereby overcome the upward thrust produced on the rollers 60 by the end of the tube being flared. By thus rounding the end of each tenon 67, point contact is provided between the tenon 67 and the substantially flat bottom face of the cap 69. Hence, very little resistance to the rotation of rollers 60 will be offered by the thrust bearing provided by the rounded end 54 and the bottom of the end cap 69 and free rolling movement of the rollers against the end of the tube being flared will be insured.

Figure 9:
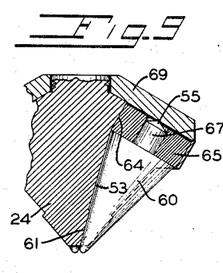
Fig. 9 is a detailed cross-sectional view showing a modified form of roller.
Figure 10:
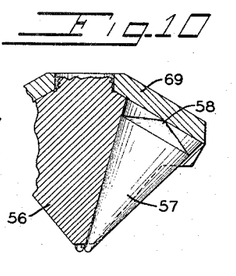
Fig. 10 is a detailed cross-sectional view showing still another form of roller.
Figure 11:
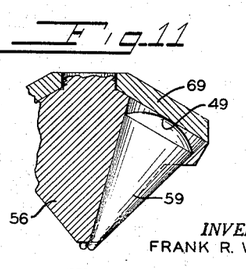
Fig. 11 is a detailed cross-sectional view showing a further form of roller.

Various other means may be used for providing an anti-friction thrust bearing between the base ends of the rollers 60 and the bottom face of the end cap 69, some of which are shown in Figs. 9, 10 and 11. As shown in Fig. 9, the tenon 67 of the roller 60 may be provided with a conical point 55 in place of the spherical surface 54. By this means also, point contact may be provided between the upper end of the tenon and the bottom face of the cap 69 so as to provide for minimum, frictional resistance between the roller and the end cap when end thrust is applied on roller 60 during tube flaring operations. In Fig. 10 a slightly modified form of flaring cone 56 is provided. In this instance the cone is provided with a series of true conical recesses for receiving conical rollers 57. In the case of the cone 56, the bearing surface 61 is dispensed with as is also the clearance 53 so that the roller 57 is supported throughout its length by the face of the recess. The upper end of each roller 57 is provided with a conical point 58 so as to afford point contact between the upper end of the roller and the bottom face of the end cap 69 during tube flaring operations. In Fig. 11 a similar cone 56 is provided but, in this case, the recesses in the cone are adapted to receive conical rollers 59, the base ends of which are rounded as indicated at 49 so as to provide point contact between the upper end of the roller and the bottom face of the cap 69.

Figures 12, 13, 14, 15, 16:
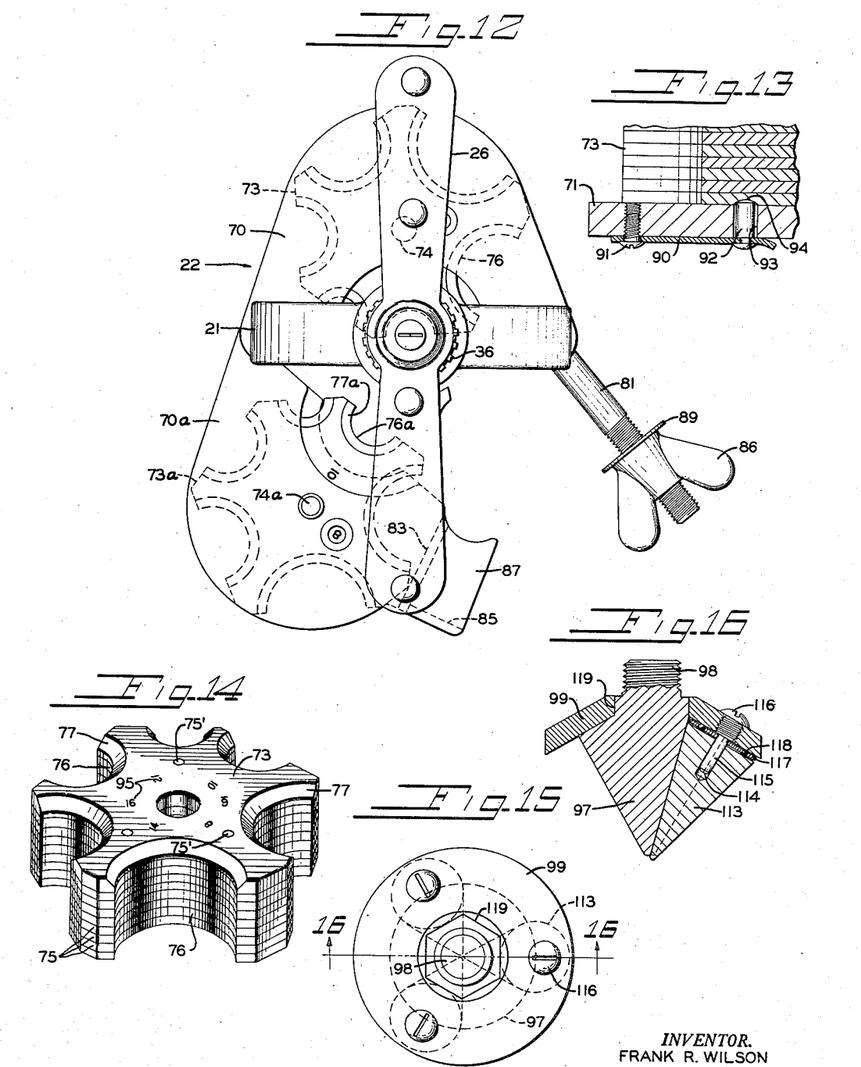
Fig. 12 is a top plan view of the flaring tool shown in Fig. 1, the clamping means being shown in the open position in this view, and the handle being positioned at right angles to its Figs. 1 and 5 position.
Fig. 13 is a fragmentary, cross-sectional view taken along the line 13—13 of Fig. 7.
Fig. 14 is a perspective view of one of the clamping members.
Fig. 15 is a plan view of a modified form of flaring cone.
Fig. 16 is a cross-sectional view taken along the line 16—16 of Fig. 15.

The means for clamping the tube to be flared in position beneath the flaring cone is best shown in Figs. 7 and 8 and comprises a first pair of base plates 70 and 71 which are hingedly connected by a bolt 72 to a second pair of base plates. The second pair of base plates are similar in construction to the first pair, and therefore will be designated as 70a and 71a, and like parts associated with each pair of plates will be given like numerals, those associated with the second pair carrying the suffix "a." Between each pair of base plates is a polygonal tube clamping member 73 and 73a each of which is rotatable about a pivot bolt 74 and 74a mounted in the base plates. The members 73 and 73a may either be machined from a solid block of metal or they may be built up from a series of stamped laminations 75 as shown in Fig. 14. The laminations are secured together to form the polygonal clamping member by means of three rivet pins 75' (Fig. 14) and the edges or sides of each clamping member are provided with hemi-cylindrical slots 76 and 76a, respectively. The slots 76 and 76a are provided at their upper ends with countersunk portions 77 and 77a, respectively, to provide a backup face for supporting the flared end of a tube in case the particular clamping means shown herein should be used with a conventional flaring cone. This face is not required, however, when my improved style of tube flaring cone is used.

The number and size of the slots 76 provided in the clamping member 73 are, of course, equal in number to and matching in size with the slots 76a provided in the member 73a so that each of the clamping members may be rotated about its pivot bolt 74 and 74a to bring together matching, hemi-cylindrical slots and thereby form a cylindrical tube clamping opening when the two pairs of base plates are swung from the open position, shown in Fig. 12, to the closed position, shown in Fig. 7. The hemi-cylindrical slots of each member 73 and 73a are so located about the periphery of the member that their centers of curvature are all equidistant from the axis of rotation of the member. Also, each of the slots 76 and 76a provided in the members 73 and 73a are of a different radius so as to accommodate tubes of differing sizes. Furthermore, the slots are not arranged in the order of their diameter or radius, but are so positioned about the outer periphery of the clamping members so as to enable the member to accommodate the maximum number of slots. However, the centers of curvature of all of the slots for a particular clamping member lie on a circle whose center is located at the center of the pivot bolt on which the member is rotatably supported. Toward this same end, the faces of the members are irregular in size, some being longer than others, that is, the faces in which the larger slots are located are longer than the faces in which the smaller slots are located so that the size of the clamping members is kept much smaller than would be possible if all the faces were made of the same size.

As mentioned earlier herein, the second pair of base plates 70a and 71a are hinged on the bolt 72 so that this pair of plates may be swung from the closed position shown in Fig. 7 to the open position shown in Fig. 12, and vice versa. The base plates 70a and 71a are hinged on the bolt 72 by means of a U-shaped bracket 78 (see also Fig. 1) which lies between and is welded to the base plates 70a and 71a. The laterally turned ears of the bracket are bored to receive a sleeve 79 (Fig. 8) which is adapted to be received in similar holes provided in base plates 70 and 71. The hinge bolt 72 is provided with a shank which fits within the sleeve 79, and also with a threaded tenon adapted to screw into the lower end of leg 19 of the yoke 21. Thus, the second pair of base plates 70a and 71a may be swung about the pivot provided by the bolt 72 and the bushing 79, the ears of the bracket 78 being adapted to rotate on the sleeve 79 which is clamped tightly in place by the bolt 72.

The two pairs of base plates are adapted to be clamped together in their closed positions by means of a clamping bolt 81 which is hinged on a bolt 84 screwed into the lower end of the leg 18 of the yoke 21. As shown in Fig. 6, the inner end of bolt 81 is secured to a sleeve 82 which is rotatably journaled on a bushing 80 which is received at either end in holes provided therefore in base plates 70 and 71. Hence, the bolt 84, when screwed into the tapped hole provided therefore in the bottom of leg 18 of the yoke, will retain the bushing 80 in said holes in the plates 70 and 71 and provide a pivot for the bolt 81 secured to the sleeve 82. A U-shaped bracket (Figs. 6 and 7) 83 is welded between ears 87 and 88 provided on the base plates 70a and 71a and a slotted plate 85 is welded between the top and bottom flanges of the bracket 83 at the outer end thereof, as shown in Fig. 6, so as to provide a surface against which a wing nut 86 threaded on the bolt 81 may be tightened. If desired, a washer 89 may be interposed between the wing nut 86 and the slotted plate 85 to facilitate the clamping action of the wing nut against the plate. By loosening the wing nut 86, the bolt 81 may be swung outwardly to the position shown in Fig. 12 after which the pair of base plates 70a and 71a may be swung away from the base plates 70 and 71 so as to permit removal of the tube which has been flared and the insertion of another tube in the clamping device. The pair of base plates 70a and 71a is then swung to the closed position shown in Fig. 7, whereupon the clamping bolt 81 is swung inwardly, the shank of the bolt being received within the slot provided in the end plate 85. The wing nut 86 is then tightened so as to clamp the two pairs of base plates together and securely clamp the tube to be flared within the aperture provided by the hemi-cylindrical slots 76 and 76a provided in the clamping members 73 and 73a. It will be noted that the yoke 21 and the first pair of base plates 70 and 71 are immovable with respect to one another, and that the second pair of base plates 70a and 71a is mounted for pivotal movement relative to the first pair of base plates and to the yoke 21.

Means are provided on each of the clamping members for assisting the operator in selecting the desired hemi-cylindrical slots so that matching slots of the proper size will be opposite one another when the members are swung together. As shown in Fig. 13, a leaf spring 90 is secured to the base plate 71 by means of a screw 91. The spring 90 carries a detent pin 92 which extends upwardly through a hole 93 provided in the base plate. The clamping member 73 is provided with a series of notches or dimples 94 (Fig. 7), there being one such dimple for each hemi-cylindrical slot 76. Thus, as the clamping member is rotated to bring the desired slot into position, the rounded end formed on the detent pin 92 will snap into the appropriate dimple 94 to accurately locate the clamping member in correct clamping position. A similar locating means consisting of elements 90a to 94a, inclusive, is provided for the clamping member 73a.

To further assist the user of the tool in selecting the proper clamping slot 76 or 76a, the clamping members 73 and 73a are each provided with a series of numerals 95 and 95a (Fig. 14) inscribed on the upper face thereof. As shown in Fig. 5, the upper base plates 70 and 70a are each provided with a sight opening 96 and 96a, respectively, through which the numerals 95 and 95a may be viewed. Hence, the appropriate numeral 95 or 95a will appear in the sight openings each time a clamping slot 76 and 76a is brought into operative position. The numerals 95 and 95a shown herein are adapted to indicate the size of the clamping slot in sixteenths of an inch. Thus, if the numeral 8 is brought into position beneath each sight opening 96 and 96a as shown in Fig. 5, this will indicate to the user of the tool that the proper clamping slot for a ½" tube is located in operative position.

In Figs. 15 and 16 I have shown a modified form of flaring cone which may be used in place of the flaring cone 24 previously described. In this modification, a flaring cone 97 is formed with a threaded shank 98 by means of which it may be screwed into the head 31 on the shaft 32 in the same manner as the flaring cone 24. The cone 97 is provided with a plurality of conical recesses spaced evenly about its periphery, each recess being in the form of a half-cone, i. e., a conical recess whose cross section at any point is that of a half-circle, or 180°. Received within each conical recess formed in the cone 97 is a conical roller 113 having axial bore 114 provided in the base end thereof. Received within the bore 114 is a tenon 115 formed on a screw 116 which is adapted to be received within a tapped hole provided in the end cap 99. Interposed between the base of the roller 113 and the under side of the cap 99 is an anti-friction bearing comprised of a thin retaining washer 117 having a central aperture for loosely receiving the tenon 115, and a series of spaced apertures for loosely receiving and retaining a plurality of small, steel balls 118. Hence, the upward thrust produced on the roller 113 by the tube being flared will be absorbed by the anti-friction thrust bearing provided by the balls 118 so as to facilitate free rolling movement of the roller 113 during tube flaring operations. If desired, any other suitable anti-friction bearing might be used in place of the retaining washer 117 and balls 118 for absorbing the upward thrust on the roller. In order to maintain the tenon 115 of each screw 116 centrally located within its respective conical recess, the end cap 99 is provided with a hexagonal aperture 119 which is adapted to be received on a corresponding hexagonal shank provided on the base end of the cone 97. The tenons 115 will thus be lined up with the axes of the conical recesses and will therefore retain the rollers in axial alignment with the recesses.

The embodiment of the flaring tool shown in Figs. 17 to 21, inclusive, differs from the embodiment just described only in the means for rotating and advancing the flaring cone, and, accordingly only that part of the tool will be described.

Figures 17, 18, 19, 20, 21:
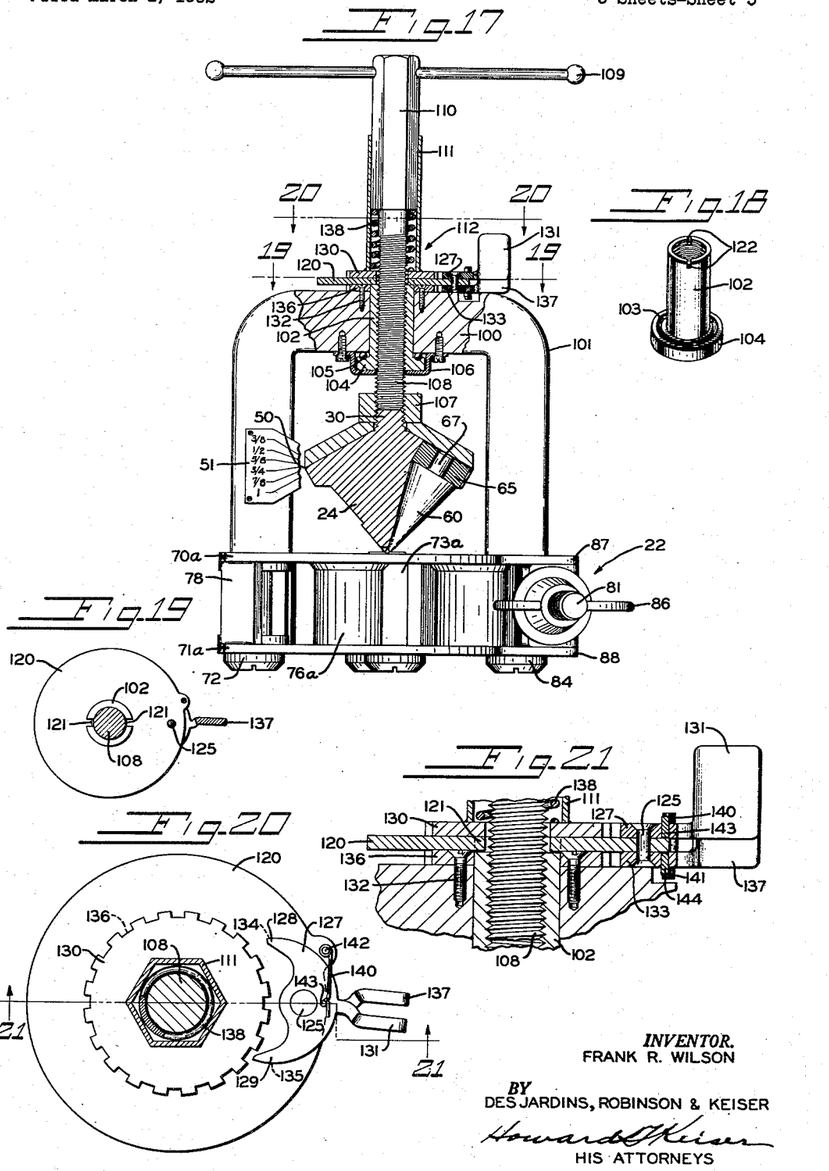
Fig. 17 is a side elevation of a modified form of flaring tool.
Fig. 18 is a perspective view of the internally threaded sleeve shown in Fig. 17.
Fig. 19 is a cross-sectional view taken along the line 19—19 of Fig. 17.
Fig. 20 is a cross-sectional view taken along the line 20—20 of Fig. 17.
Fig. 21 is a cross-sectional view taken along the line 21—21 of Fig. 20.

The tool is provided with a U-shaped fitting or yoke member 101 comprised of a pair of downwardly extending legs connected at their upper ends by a crossarm or sleeve carrying member 100. The crossarm 100 is provided with a vertically disposed bore in which is journaled an internally threaded member or sleeve 102. At its lower end, the sleeve 102 is provided with an integral flange 104 the upper face of which is provided with an annular raceway 103 in which is received a series of small steel balls 105. The sleeve 102 is retained in position within the bore provided in the crossarm 100 by a cap 106 which is secured to the under side of the crossarm 100 by a plurality of small screws received within tapped holes provided in the under side of the crossarm 100. The flaring cone 24, fitted with conical rolls 60, is mounted on the lower end of a threaded shaft member 108 which is received within the threaded sleeve 102. The cone 24 is held in position on the lower end of the shaft 108 by means of a nut 107 which is adapted to screw onto the lower end of the shaft and also onto the upper end of the threaded shank 30 of the flaring cone 24. At its upper end, the shaft 108 is provided with a hexagonal shank 110 which is provided with a transverse bore for receiving an operating handle 109. The hexagonal shank 110 is surrounded by a hexagonal sleeve 111 which is secured at its lower end to a clutch or coupling means 112 for selectively connecting the sleeve 102 with the shaft 108 for conjoint rotation.

Like the ratchet means provided for the tube flaring tool shown in Figs. 1 to 14, inclusive, the coupling means 112 is movable to either of two positions. When the coupling means is in one position, rotation of the handle in one direction serves to advance the cone against the end of the tube to be flared. When the direction of rotation of the handle is reversed, the cone is rotated without feeding movement so as to burnish the end of the tube. When the coupling means is shifted to the other position, continued reverse rotation of the handle will return the cone to its starting position. To accomplish this, when the coupling means 112 is moved to the first-mentioned position in which clockwise rotation of the handle causes downward feeding movement of the flaring cone 24, the sleeve 102 is locked against rotation within the bore provided within the cross bar 100 of the yoke 101 so that rotation of the handle causes relative rotation between the threaded shaft 108 and the sleeve 102 thereby feeding the shaft and cone downwardly relative to the sleeve. However, when the direction of rotation of the handle is reversed, the sleeve 102 and shaft 108 will rotate together as a unit and thus no feeding movement of the cone will be produced. When the coupling means is reversed, however, relative rotation will occur between the shaft and the sleeve so as to retract the cone.

As best shown in Figs. 20 and 21, the coupling means 112 includes a disc 120 which is apertured to receive the upper end of sleeve 102. A pair of diametrically opposed lugs 121 (Fig. 19) formed on the disc 120 are adapted to be received within notches 122 (Fig. 18) provided in the upper end of the sleeve 102 thus keying the disc 120 to the sleeve 102. The disc 120 is provided near its periphery with a hole through which extends a rivet 125 on which upper and lower dogs 127 and 133 are pivoted. The dog 127 is provided with two ratchet engaging teeth 128 and 129 (Fig. 20) which are adapted to engage the teeth of an upper ratchet 130 secured to the lower end of the sleeve 111. Since the sleeve 111 is keyed to the shaft 108 for rotation therewith by reason of its hexagonal conformation which corresponds to the hexagonal shape provided on the shank 110 of the shaft, the ratchet 130 will rotate with the shaft 108. The dog 127 is provided with an offset handle 131 to provide for manipulation of the dog in a manner to be more fully explained hereinafter.

The lower dog 133 is provided with two ratchet-engaging teeth 134 and 135 which correspond with the teeth 128 and 129 formed on the dog 127. The lower dog 133 is adapted to cooperate with a lower ratchet 136 which is similar to the ratchet 130 and is adapted to be secured to the yoke by small screws 132. Like the upper dog 127, the lower dog 133 is provided with an offset handle 137 which projects upwardly and lies alongside the handle 131. Hence the handles 137 and 131 may be grasped by the fingers and moved simultaneously so as to simultaneously reverse the positions of both dogs 127 and 133. However, since both dogs are loosely pivoted on the same rivet 125, they may move independently of one another in either position of the handles 131 and 137. The dogs are held either in the position shown in Fig. 20 where the teeth 129 and 135 are in position to cooperate with the teeth of the ratchets, or in a shifted position in which the noses 128 and 134 are in position to cooperate with the ratchets, by means of a pair of toggle springs 140 and 141 (Fig. 21) which are mounted on a stud 142 carried by the disc 120 with their free ends bearing against pins 143 and 144 mounted in the dogs 127 and 133, respectively.

The sleeve 111 and the upper ratchet 130 secured thereto are resiliently urged downwardly by means of a compression spring 138 wound around the threaded shaft 108. The upper end of spring 138 bears against the lower end of the hexagonal shank 110 while its lower end engages with the upper face of the ratchet 130. Hence, the spring 138 will apply a continuous, downward pressure against the ratchet 130 and hold it in place against the upper face of the disc 120 despite the up and down movement of the threaded shaft 108 during advancement and retraction of the flaring cone 24.

With the dogs 127 and 133 in the position shown in Fig. 20, rotation of the handle 109 and the shaft 108 in a clockwise direction will, through the sleeve 111, cause the ratchet 130 to also rotate clockwise. As the ratchet 130 rotates clockwise, the tooth 129 of the dog 127 will ratchet over the teeth of the ratchet 130, but the nose 135 of the dog 133 will bite into the lower ratchet 136 secured to the yoke and prevent the disc from turning. Hence, the sleeve 102 which is keyed to the disc 120 will be held stationary and relative rotation will take place between the threaded shaft 108 and the sleeve 102 with the result that the flaring cone 24 will be fed downwardly toward the tube held in the clamping device 22.

After the flare has been produced by the flaring cone, the handle may be rotated counterclockwise to cause burnishing of the flare. Counterclockwise rotation of the handle will, by virtue of the friction produced between the threads on the shaft 108 and the threads on the sleeve 102 by upward pressure on the flaring cone, which friction is greater than the frictional restraint between the sleeve and the yoke due to the antifriction bearing 105, cause the shaft and sleeve to rotate as a unit, the nose 135 being free to ratchet over the teeth on ratchet 136. At the same time, the nose 129 will be in position to engage with the teeth of ratchet 130 to bring about the same result. Consequently, no further advancing movement of the cone will take place and reverse rotation of the handle 109 will cause burnishing of the flare previously produced on the tube. If, now, the dogs 127 and 133 are reversed from their positions shown in Fig. 20 and counterclockwise rotation of the handle continued, the tooth 134 of the lower dog will bite into the ratchet 136 secured to the yoke and prevent counterclockwise turning of the disc 120. The tooth 128 of the upper dog will ride over the ratchet 130 and permit this ratchet to turn counterclockwise relative to the disc 120. Hence, the shaft 108 will be rotated counterclockwise while the sleeve 102 attached to disc 120 is held stationary and the flaring cone will be returned to its raised position. After the flaring cone has been elevated sufficiently to bring the index 50 thereon opposite the upper edge of the scale 51 further counterclockwise rotation of the handle may be discontinued and the dogs again flipped to the position shown in Fig. 20 so as to prepare the tool for flaring the next tube to be placed in the clamping device. The operator may now insert the next tube to be flared, the unflared tube end being pressed upwardly through the clamping aperture in the clamping device until it comes in contact with the rollers 69 of the flaring cone. The tube is then tightly clamped in place and the handle 109 rotated clockwise so as to advance the flaring cone into the tube. After the index 50 has been moved down to a point opposite the ruling 52 (Fig. 8) corresponding to the size of the tube being flared, the direction of rotation of the handle may be reversed to cause burnishing of the flare and, after this has been accomplished, the dogs may be shifted to retract the flaring cone and bring the index 50 back to the starting point represented by the upper edge of the scale 51.

An alternative procedure which may be utilized to effect flaring and burnishing of the tube is as follows:

With the dogs in the positions shown in Fig. 20, the tube may be flared by clockwise rotation of the handle which causes the cone to be rotated and advanced into the end of tube. After a flare of the desired dimensions is produced on the tube, the dogs may be shifted to bring the noses 128 and 134 thereof into engagement with the teeth of the ratchets 130 and 136 and clockwise rotation of the handle continued. The frictional restraint between the threads of the shaft 103 and sleeve 102 will cause these two members to rotate as a unit and thereby cause the cone to rotate without feed and burnish the flare produced on the tube. At the same time, the nose 123 will lie in position to engage with the teeth of the ratchet 130 to bring about the same result. After the flare has been burnished, the handle may be turned in a reverse direction whereupon nose 134 of the bottom pawl will engage with the teeth of ratchet 136 and prevent turning of the sleeve 102 as the shaft is rotated counterclockwise. This will cause retraction of the flaring cone.

Having now described my invention in considerable detail in connection with the embodiments illustrated in the accompanying drawings, and having, in connection with such description, utilized certain specific terms and language herein, it is to be understood that the present disclosure is illustrative rather than restrictive and that changes and modifications may be resorted to without departing from the spirit or scope of the claims appended hereto.

Having thus described my invention, what I claim as new and useful and desire to secure by United States Letters Patent is:

1. A tube flaring tool comprising a hollow sleeve member having a screw thread on one cylindrical surface and being smooth on the other cylindrical surface, a yoke member having an aperture therein for receiving and supporting said sleeve member for rotation, the surface of said aperture conforming to the outer surface of said sleeve member, a shaft member passing through said hollow sleeve member and supported for rotation by said sleeve member, said shaft member having an outer surface thereon conforming to the inner surface of said sleeve member, one of said above-named surfaces of the aperture and shaft member having a screw threaded surface thereon meshing with the screw threaded surface on said sleeve member and the other of said surfaces being smooth and in contact with the smooth surface of said sleeve member, a clamping means supported on said yoke member for holding the tube to be flared, a flaring cone secured to one end of said shaft member, means on the other end of said shaft member for turning the same, the thrust of the cone on the work being resisted by the two members having the meshing screw threaded surfaces, an antifriction bearing for absorbing the axial thrust between the two members having the smooth contacting surfaces to enable free turning movement between said smooth contacting surfaces, and coupling means for preventing relative turning movement between the two members having the smooth contacting surfaces when the shaft member is turned in one direction to thereby enforce relative rotation between the two members having the meshing screw threaded surfaces and cause said cone to be fed into the tube, said coupling means also causing relative rotation between said two members having the smooth contacting surfaces when the shaft member is turned in the reverse direction by virtue of the combined action of the antifriction bearing and the frictional restraint between the two members having the meshing screw threaded surfaces resulting from the axial thrust exerted on the cone and shaft member by the tube being flared to thereby cause the cone to turn without feed and effect burnishing of the flare.

2. The tube flaring tool of claim 1 wherein said coupling means includes a pair of abutment elements, one of said elements being carried by one of said two members having the smooth contacting surfaces and the other of said elements being carried by the other of the two members having the smooth contacting surfaces, said elements being adapted to abut against one another when said shaft member is turned in said one direction and prevent relative turning movement between said two members having the smooth contacting surfaces thereby enforcing relative rotation between the two members having the meshing screw threaded surfaces and causing the cone to be fed into the tube, said elements being adapted to move away from one another when said shaft member is turned in said reverse direction and cause relative rotation between said two members having the smooth contacting surfaces by virtue of the combined action of said antifriction bearing and the frictional restraint between the two members having the meshing screw threaded surfaces resulting from the axial thrust exerted on the cone and shaft member by the tube being flared to thereby cause the cone to turn without feed and effect burnishing of the flare.

3. The tube flaring tool of claim 1 wherein said coupling means includes an abutment element carried by one of said two members having the smooth contacting surfaces and a shiftable element carried by the other of the two members having the smooth contacting surfaces, said shiftable element being movable relative to its associated member between a first position in which it coacts with said abutment element to prevent relative turning movement between said two members having the smooth contacting surfaces when the shaft member is turned in said one direction to enforce relative rotation between the two members having the meshing screw threaded surfaces and cause said cone to be fed into the tube, and a second position in which it coacts with said abutment element to prevent relative turning movement between said two members having the smooth contacting surfaces when the shaft member is turned in said reverse direction to enforce relative turning movement between the two members having the meshing screw threaded surfaces and cause the cone to be retracted.

4. A tube flaring tool comprising a yoke having an internally threaded opening therein, a tube clamping means supported on said yoke for holding the tube to be flared, a sleeve extending through the opening and having external threads meshing with the threads in the opening, a shaft extending through said sleeve and rotatably journaled therein, a flaring cone secured to one end of said shaft, means on the other end of said shaft for turning the same, an antifriction thrust bearing interposed between said sleeve and said shaft to absorb the axial thrust exerted on the shaft during tube flaring operations and to allow the shaft to turn freely within said sleeve, and a driving connection between said shaft and said sleeve effective to connect the two together for conjoint rotation when the shaft is turned in one direction to cause the cone to be fed into the tube and flare the same, and to disconnect said sleeve from said shaft when the shaft is turned in the reverse direction to allow the sleeve to remain stationary while the shaft turns by virtue of the frictional restraint imposed on the sleeve by the threads in the opening due to the axial thrust exerted on the sleeve by the cone and shaft through the antifriction bearing whereby the cone will turn without feed and effect burnishing of the flare.

5. The tube flaring tool of claim 4 wherein said driving connection includes an abutment member moving with said sleeve, and means moving with said shaft for driving said member when the shaft is turned in one direction and for disengaging said member when the shaft is turned in the opposite direction.

6. The tube flaring tool of claim 4 wherein said driving connection includes an abutment element carried by said sleeve and a reversible pawl cooperating with said element and carried by said shaft, said pawl being movable between a first position in which it coacts with said element to connect the sleeve and shaft for conjoint rotation when the shaft is turned in said one direction to cause the cone to be fed into the tube, and a second position in which it coacts with said element to connect the sleeve and shaft together for conjoint rotation when the shaft is turned in the reverse direction to cause the cone to be retracted.

7. The tube flaring tool of claim 4 wherein said shaft turning means includes a handle secured to said shaft and comprised of a pair of spaced plates, and said driving connection includes a ratchet received between said plates and secured to the outer end of said sleeve, and a reversible pawl pivotally supported between said plates and cooperating with said ratchet, said pawl being movable between a first position in which the sleeve and handle are connected for rotation together only in one direction, and a second position in which the sleeve and handle are connected for rotation together only in the opposite direction.

8. The tube flaring tool of claim 1 wherein said hollow sleeve member is internally threaded and is journaled for rotation in the aperture of said yoke member and said shaft member comprises a threaded shaft meshing with the threads in said sleeve member, and wherein said coupling means prevents relative rotation between said sleeve member and said yoke member when the shaft is turned in said one direction and permits relative rotation between said members when the shaft is turned in said reverse direction.

9. The tube flaring tool of claim 8 wherein said coupling means includes an abutment member carried by said yoke member, and means carried by said sleeve member for engaging said abutment member when the shaft is turned in said one direction to hold the sleeve member against rotation, and for disengaging said abutment member when the direction of rotation of the shaft is reversed to allow the sleeve member to turn with the shaft.

10. The tube flaring tool of claim 8 wherein said coupling means includes a ratchet carried by said yoke member, and a pawl moving with said sleeve member for engaging said ratchet when the shaft is turned in said one direction to hold the sleeve member against rotation, and for disengaging the ratchet when the direction of rotation of the shaft is reversed to allow the sleeve member to turn with the shaft.

References Cited in the file of this patent

UNITED STATES PATENTS

| Number | Name | Date |
|---|---|---|
| 30,535 | Mack | Oct. 30, 1860 |
| 199,350 | Caswell | Jan. 22, 1878 |
| 775,572 | Lovekin | Nov. 22, 1904 |
| 956,334 | Gallon | Apr. 26, 1910 |
| 972,122 | Merrill | Oct. 4, 1910 |
| 1,038,881 | Hatton | Sept. 17, 1912 |
| 1,328,208 | Schonk | Jan. 13, 1920 |
| 1,383,839 | Mueller | July 5, 1921 |
| 1,543,583 | Mason | June 23, 1925 |
| 1,623,045 | Butt | Apr. 5, 1927 |
| 1,680,798 | Maupin | Aug. 14, 1928 |
| 1,732,861 | Rosenbloom | Oct. 22, 1929 |
| 1,752,508 | Schultis | Apr. 1, 1930 |
| 1,762,670 | Siesko | June 10, 1930 |
| 1,795,358 | Arndt | Mar. 10, 1931 |
| 1,871,616 | Kerr | Aug. 16, 1932 |
| 1,962,522 | Paterson | June 12, 1934 |
| 1,976,878 | Eden | Oct. 16, 1934 |
| 2,071,314 | Andrus | Feb. 23, 1937 |
| 2,277,410 | Neukirch | Mar. 24, 1942 |
| 2,285,025 | French | June 2, 1942 |
| 2,415,520 | Obecny | Feb. 11, 1947 |
| 2,424,871 | Wenk | July 29, 1947 |
| 2,505,665 | Franck | Apr. 25, 1950 |
| 2,563,088 | Wilks | Aug. 7, 1951 |
| 2,595,036 | Wolcott | Apr. 29, 1952 |
| 2,604,139 | Franck | July 22, 1952 |

FOREIGN PATENTS

| Number | Country | Date |
|---|---|---|
| 8,632 | Austria | Aug. 11, 1902 |